United States Patent [19]
Kupchan

[11] 3,846,434
[45] Nov. 5, 1974

[54] PROCESS FOR OBTAINING A GERMINE ADDUCT FROM GERMINE VALUES

[76] Inventor: Solomon Morris Kupchan, Ednam Forest, Charlottesville, Va. 22901

[22] Filed: Feb. 16, 1970

[21] Appl. No.: 11,776

Related U.S. Application Data

[63] Continuation-in-part of Ser. No. 771,303, Oct. 28, 1968, abandoned.

[52] U.S. Cl...... 260/287 R, 260/236 V, 260/289 A, 260/289 R, 424/258
[51] Int. Cl............................................ C07d 39/00
[58] Field of Search........ 260/289 A, 289 R, 236 V, 260/287 R

*Primary Examiner*—Donald G. Daus
*Assistant Examiner*—Jose Tovar

[57] ABSTRACT

Process for the separation of germine from germine values by treating the germine values with a basic hydrolysis system, removing substantially all of any alkanol which is present in said basic hydrolysis system, forming a solid adduct with the thus liberated germine by contacting the same with a liquid water-immiscible halogenated hydrocarbon. The resulting adduct is useful in preparing germine diacetate.

13 Claims, No Drawings

PROCESS FOR OBTAINING A GERMINE ADDUCT FROM GERMINE VALUES

This application is a continuation-in-part of U.S. application Ser. No. 771,303, filed Oct. 28, 1968, now abandoned.

This invention relates to a process for treating alkaloid extracts and more particularly to the separation and isolation of crystalline germine from alkaloidal extracts containing germine values.

The compound germine is a highly hydroxylated alkamine, the structure of which has been reported by S. Morris Kupchan and C. R. Narayanan in the Journal of The American Chemical Society, 81 1913 (1959). As far as is known, the compound does not occur in nature in free form, but rather in the form of complex derivatives thereof, notable among which are the ester derivatives. A wide variety of such esters has been isolated from various sources as will be described in more detail below. These derivatives are hydrolyzable and yield free germine upon hydrolysis. As used herein, the term germine values has reference to the derivatives of germine as found in various alkaloidal plant extracts and which are hydrolyzable to form germine itself.

Germine values in nature are found principally in species of the plant genus Veratrum. In general, substantial amounts of germine values are present therein, and within the genus the species *Veratrum album*, *Veratrum viride*, *Veratrum eschscholtzii* and *Veratrum fimbriatum* are readily available and especially suitable.

Crude Veratrum plant extracts have been used for many years for medicinal purposes, including treatment of hypertension, as cardiac tonics and as counter-irritants in neuralgia. In recent years, research efforts have been directed largely to determining the active principles in the plant and ascribing pharmacological activity to the appropriate principle. Purification of plant extracts has revealed that the extracts are actually very complex mixtures of a variety of alkaloids and further work has shown that the germine esters present therein possess relatively good hypotensive characteristics.

Prior work has also shown that Veratrum alkaloid extracts were found to be moderately effective in the treatment of myasthenia gravis. Unfortunately, the usefulness of the alkaloids in the management of the disease was severely restricted, owing probably to hazardous side effects caused by some alkaloids in the extracts. In a paper entitled "Treatment of Myasthenis Gravis With Germine Diacetate," New England Journal of Medicine 275 1207–1214 (1966) W. Flacke et al, the entire contents of which are incorporated herein by reference, a series of synthetic germine acetates, notably germine diacetate, was demonstrated to be useful in alleviating the symptoms of myasthenia gravis. Since germine is a starting material for producing germine diacetate as described in S. M. Kupchan and C. R. Narayanan, supra, it would be very desirable indeed to have direct economical process for obtaining germine in relatively pure form.

The separation and isolation of germine from plant extracts containing germine values is complicated by the complex nature of the plant extracts. As stated, they typically contain a wide variety of alkaloids, the presence of which largely interferes with the separation and isolation of any given one. Typically found in Veratrum extracts, for example, are jervine, rubijervine, veratramine; esters of protoverine, such as protoveratrine; and germine values such as esters of germine, typified by germitetrine, germitrine, neogermitrine, germanitrine, germerine and many more as, for example, set forth in the paper "Hypotensive Veratrum Ester Alkaloids," Journal of Pharmaceutical Science, Vo. 50, No. 4, April 1961, S. Morris Kupchan. In such extracts, the germine value content is usually found in amounts ranging from 0.25 to 0.50 percent by weight based on the weight of dried plant material, thus representing a good source of the material.

Prior processes for recovering germine have involved the use of complex counter-current extraction techniques requiring very sophisticated and expensive equipment. Other processes have been suggested wherein germine values are hydrolyzed in methanolic sodium hydroxide and treated with chloroform to form a solid adduct, as reported in the "The Veratrine Alkaloids," Papers XV and XVII, Walter A. Jacobs and Lyman C. Craig, *Journal of Biological Chemistry*, 148, pp. 41–50 and 57–66 (1943). However, this technique, as described in the noted literature sources, is characterized by a low yield of germine adduct, loss of considerable quantities of germine values, and the need for a large number of repeated extractions in order to recover a significant quantity of germine. In accordance with the present invention, however, a direct, economical method of separating and recovering germine from germine values has been discovered which leads to relatively large amounts of germine in relatively pure form and which avoids the expense of the prior work.

In general, the process of the invention involves hydrolyzing germine values, in an alkaline medium which may comprise a lower alkanol, preferably in the substantial absence of other hydrolyzable alkaloidal derivatives, but at least in the substantial absence of protoveratrine, removing substantially all of the alkanol from the medium at the end of the hydrolysis, treating the hydrolyzate with a liquid, water-immiscible halogenated hydrocarbon in the presence of water to obtain a solid adduct of the germine and the halogenated hydrocarbon. The germine adduct may be converted to alkanol solvates in accordance with known techniques.

In practicing the process of the present invention, the plant extract containing germine values, and substantially free of other alkaloid esters, especially protoveratrine and jervine, is first treated with a hydrolyzing agent. A suitable source of the germine values to be hydrolyzed is the ether-soluble fraction of the plant extract. It has been found that alkaloidal derivatives, and especially protoveratrine, which are insoluble in ethers, present difficulty after hydrolysis in the separation of germine and for that reason are most preferably removed from the alkaloid mixture prior to hydrolysis. A suitable means for doing this is to treat the amorphous alkaloid mixture with diethyl ether at slightly elevated temperatures of the order of 35°C. The germine values go into solution and the ether insolubles are separated therefrom after cooling. Other solvents may be used such as dimethyl ether and isopropyl ether, as desired. As used herein, the term "ether-soluble" fraction has reference to constituency of the material to be hydrolyzed, rather than to the use of a particular solvent to separate the germine values from the other alkaloidal esters. The germine values once separated from the other alkaloidal esters are then preferably isolated from the organic solution by an evaporation of solvent, for example, and hydrolyzed.

The hydrolysis is preferably carried out using a basic hydrolyzing system. For example, there may be used potassium hydroxide, sodium hydroxide, or alkali metal alkoxides, preferably in an alcohol medium such as a lower alkanol, typified by methanol, ethanol, propanol, isopropanol, butanol, t-butanol and the like. Water may also be present in the system. The preferred system is aqueous potassium hydroxide in methanol. The amount of reagents used is not unduly critical, but it is preferred for reasons of economy to use an excess of the basic medium.

The time and temperature of hydrolysis are somewhat interrelated, high temperatures resulting in hydrolysis in a relatively short time while lower temperatures require somewhat longer reaction times for essentially complete reaction. The conditions of hydrolysis should be such as to keep formation of isogermine to a tolerable minimum. In this regard, hydrolysis of the germine values at reflux temperatures of the order of 65°–70°C, result in essentially complete hydrolysis in from ½ to about 2 hours. Appreciable amounts of germine are isomerized to isogermine under reflux for periods of around 5 hours and it is, therefore, preferred to use reaction times shorter than about 5 hours when reflux temperatures are employed. Reflux temperatures for about ½ – 1 hour are suitable and preferred, although lower temperatures, for example 0°C for 24 hours, may be employed if desired.

As a result of the hydrolysis step, free germine is obtained in solution together with degradation products and other contaminants. The germine is obtained therefrom by subjecting the hydrolyzate to the two phase adduct formation step hereinafter described. Where a lower alkanol, especially methanol, is used in the hydrolyzing medium essentially all of the methanol will be removed prior to treating the hydrolyzate with the halogenated hydrocarbon in the adduct formation step. The reason for this is thought to be the effect that the methanol has on the solubility of free germine in water. Methanol appears to increase the solubility of germine in water as a result of which, when the subsequent adduct formation step is performed, incomplete removal of the germine from the water phase is encountered to the extent that methanol is present. Other alkanols behave similarly. It is thus preferred to remove as much of the alkanol, when employed, as possible. Removal of essentially all of the alkanol from the system, is conveniently achieved by evaporating the hydrolysate to dryness, leaving amorphous germine together with other degradation products of the hydrolysis as a solid residue. Prior to evaporation, it is preferred to neutralize the hydrolysate by adding an acid. Mineral acids are suitable, especially hydrochloric acid or sulfuric acid but virtually any acid may be employed.

The adduct-formation step involves the use of a two-phase water-organic system as a medium for the formation of a solid adduct of germine. The amorphous solid hydrolysate obtained above, or a liquid hydrolysate system when an alkanol has not been used, is treated in the presence of water preferably made strongly alkaline, with a liquid, water immiscible halogenated hydrocarbon capable of forming a complex with germine. When the solid residue is employed, as is preferred, water will be added externally, whereas when the liquid hydrolysate is employed, there will ordinarily be sufficient water already present. In any event, for best results, sufficient water and liquid hydrocarbon should be present to form a two-phase liquid system in addition to that amount of hydrocarbon needed to form the solid adduct. The solid adduct precipitates out of solution, generally at the interface between the water phase and the water-immiscible hydrocarbon phase. Halogenated hydrocarbons which are suitable for forming a solid adduct with germine are the halogenated aliphatic hydrocarbons, preferably the chlorinated saturated aliphatics and especially methylene chloride, chloroform, carbon tetrachloride, dichloroethane, 1,2-dichloroethane and the like.

In a preferred aspect, the adduct formation is effected in basic medium. This has the effect of reducing further the solubility of the adduct in the water phase and affords the maximum production of the germine adduct. Virtually any base is suitable but it is highly preferred to use an alkali metal hydroxide such as sodium or potassium hydroxide. Sodium hydroxide is preferred.

Precipitation of the germine adduct is facilitated at low temperatures and may be accomplished simply by stirring the mixture for a time and then allowing the mixture to stand. Temperatures below room temperature are especially preferred, 0°–10°C being suitable.

The solid adduct is next separated form the 2-phase system and the dissolved impurities therein as by filtration, for example. The solid adduct may be used as such in the production of germine acetate esters, such as the monoacetate or dioctate, as previously described. It is also possible to treat the adduct to obtain germine -alkanol solvate therefrom. This is achieved by dissolving the adduct in a suitable solvent preferably an alcohol such as a lower alkanol, typified by methanol, ethanol, isopropanol, butanol, t-butanol and the like. Most preferably the system additionally contains an acid to aid in solubilizing the adduct in the alkanol. Suitable acids are the mineral acids, glacial acetic acid and the like, with acetic acid being preferred. Virtually any acid can be employed, however. Somewhat elevated temperatures of the order of 35° to 50°C and preferably 40° to 50°C are preferred for the germine regeneration. The free germine is then crystallized from solution by techniques known in the art. For example, the solution is neutralized or made alkaline using a suitable base such as ammonia, alkali metal hydroxides and the like, and allowed to stand. The crystalline germine solvates may be used directly for the preparation of germine acetate esters as previously described.

As a result of carrying out the above process, useful crystalline forms of germine are obtained, generally in yields ranging from about 20–50 percent by weight based on the weight of the solid plant alkaloidal extract used as starting material. The formation of the germine-adduct eliminates all need for counter current extraction, columns and the like techniques of equal complexity.

EXAMPLE 1

Dry alkaloidal extract of Veratrum album (100 g.) from which protoveratrine has previously been removed, is dissolved in 250 ml. of anhydrous ether and left to stand for 1 week at room temperature. A solid (7 g.) separates out and is filtered and found by IR spectrum to be jervine.

The ethereal mother liquors, now substantially free of alkaloidal derivatives except germine values, are evaporated to dryness in vacuo and treated with a solution of 30 g. of sodium hydroxide in 600 ml. of methanol. The solution is gently refluxed for 30 minutes, allowed to cool for 20 minutes, and then slowly neutralized with about 50 ml. of concentrated hydrochloric acid, the temperature being kept low by cooling in running water. After standing for 30 minutes, the precipitate which forms, consisting mainly of sodium chloride, is filtered off.

The neutralized hydrolyzate (filtrate) is then placed in 2-liter flask and evaporated to dryness in vacuo to remove substantially all of the methanol present. Some foaming and bumping occurs at this stage. 100 ml. of water and 150 ml. of chloroform are then added and the aqueous layer made strongly alkaline with 10 percent sodium hydroxide solution. The two-phase system is well shaken and left to stand in a refrigerator overnight. A chloroform-germine solid adduct forms at the interface of the two layers. This precipitate is filtered off, washed well with water and chloroform and dried in a steam oven (weight, 40–50 g. m.p. 213°–219° C dec., with preliminary sintering at 160°C).

To convert to the methanol solvate, the solid is dissolved by warming in 300 ml. methanol and about 10 ml. glacial acetic acid, filtered and the filtered solution concentrated to 200 ml. After making alkaline with ammonia, the solution is allowed to cool overnight. Heavy plate-like crystals form, m.p., 215°–220°C. dec. with preliminary sintering at 160°C, optical rotation $[\alpha]_D = +5$ (c, 2.77) in 95 percent alcohol. Yield, 21–23 g.

After filtration of the chloroform-germine adduct in the above procedure, the alkaline aqueous mother liquors remaining are extracted with 10, 100 ml. portions of chloroform; the extracts are combined, washed, dried, and evaporated to dryness in vacuo (weight about 5 g.). Recrystallization from methanol gives 700–800 mg. of germine crystals softening at 160°C and melting at 220–224° d.

Similar results are obtained when the above procedure is repeated using equivalent amounts of the following material in place of the indicated reagents:

Methylene chloride; carbon tetrachloride, or dichloroethane in place of chloroform;

Sodium hydroxide or lithium hydroxide in place of potassium hydroxide;

Ethanol, propanol, isopropanol, butanol, or t-butanol in place of methanol.

What is claimed is:

1. The process for obtaining a germine adduct from germine values which comprises:
   a. treating germine values substantially free of protoveratrine with a basic hydrolyzing system, and
   b. treating under substantially lower alkanol-free conditions the hydrolyzate thereby obtained with a liquid water-immiscible halogenated hydrocarbon in the presence of water, thereby to obtain a solid adduct of germine and said halogenated hydrocarbon, wherein the basic hydrolyzing system comprises an alkali metal hydroxide or an alkali metal alkoxide in a lower alkanol having 1 to 4 carbon atoms or water or mixtures thereof, and the halogenated hydrocarbon is selected from chlorinated aliphatic hydrocarbons.

2. The process according to claim 1 wherein the solid adduct obtained in step b) is c) treated with an alcohol to form a germine alkanol solvate, wherein the alcohol is selected from alcohols having 1 to 4 carbon atoms.

3. The process according to claim 2 wherein the alcohol in step c) additionally contains an acid.

4. The process according to claim 3 wherein the germine values treated are substantially free of other hydrolyzable alkaloid derivatives.

5. The process according to claim 4 wherein the hydrolyzing system comprises an alkali metal hydroxide and a lower alkanol and said lower alkanol is substantially completely removed from said hydrolyzate prior to treatment with said halogenated hydrocarbon.

6. The process of claim 5 wherein the lower alkanol is methanol.

7. The process of claim 5 wherein step b) is conducted in a basic medium.

8. The process according to claim 7 wherein the alcohol used in step c) is methanol.

9. The process according to claim 8 wherein the acid used in step c) is acetic acid.

10. The process of claim 5 wherein the germine values are derived from a species of the plant genus Veratrum.

11. The process of claim 5 wherein the hydrolyzing system comprises sodium hydroxide and methanol.

12. The process of claim 1 wherein said liquid hydrocarbon is chloroform.

13. The process of claim 5 wherein said liquid halogenated hydrocarbon is chloroform.

* * * * *